A. D. SMITH.
OIL BURNER.
APPLICATION FILED DEC. 29, 1913.
1,133,238.
Patented Mar. 23, 1915.
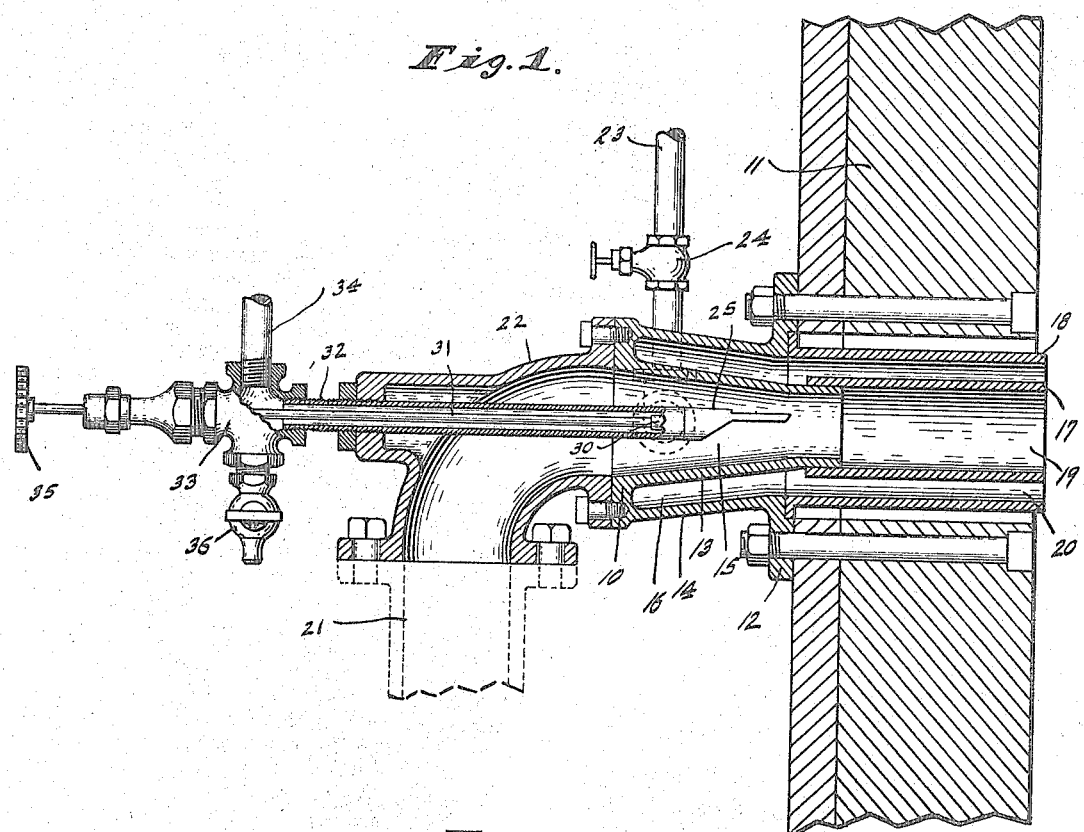
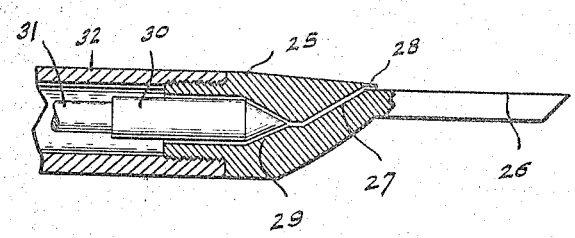
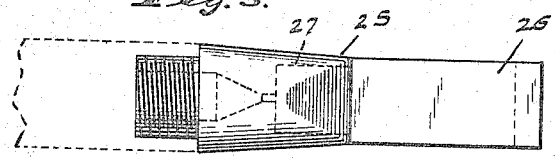
WITNESSES:
Frank A. Fahle
May Layden
INVENTOR
Albert D. Smith,
BY
Arthur M. Hood
ATTORNEY

UNITED STATES PATENT OFFICE.

ALBERT D. SMITH, OF ANDERSON, INDIANA, ASSIGNOR TO KOON'S OIL FURNACE COMPANY, OF ANDERSON, INDIANA, A CORPORATION OF INDIANA.

OIL-BURNER.

1,133,238.     Specification of Letters Patent.     Patented Mar. 23, 1915.

Application filed December 29, 1913. Serial No. 809,185.

*To all whom it may concern:*

Be it known that I, ALBERT D. SMITH, a citizen of the United States, residing at Anderson, in the county of Madison and State of Indiana, have invented a new and useful Oil-Burner, of which the following is a specification.

It is the object of my invention to provide a liquid-fuel burner in which the heaviest of fuel oils are successfully atomized, complete combustion is secured, a large range of temperatures with a high maximum is procured, close temperature adjustments are attained, and central pressure from the burner is maintained.

The preferred form of the burner by which I attain these ends is illustrated in the accompanying drawings.

In these drawings, Figure 1 is a longitudinal sectional view through the burner, showing its attachment to the furnace; Fig. 2 is an enlarged central view through the fuel tip; and Fig. 3 is a plan of the fuel tip.

A nozzle 10 is bolted or otherwise conveniently attached to the furnace wall 11, a flange 12 being provided if bolts are used. This nozzle 10 comprises inner and outer tapering walls 13 and 14, forming a central, tapering, mixing chamber 15 within the wall 13 and an annular, auxiliary air chamber 16 between the two walls 13 and 14. A pair of spaced concentric tubes 17 and 18 extend through the furnace wall 11 and coöperate with the walls 13 and 14 to provide a central passage 19 and an annular passage 20 surrounding the passage 19, by means of which passages the chambers 15 and 16 discharge through the furnace wall 11. The chamber 15 is supplied with air under pressure, which may be either at normal temperature or preheated as desired, through a conduit 21, connected by an elbow 22 to the entrance of the chamber 15; and the chamber 16 is supplied with preheated air under pressure through a conduit 23 in which is located a control valve 24.

Located within the chamber 12 is my improved fuel tip 25. This tip has at its forward end a plate 26, preferably flat on top, and in its main body is provided with an upwardly inclined passageway 27, having its upper or discharge end 28 down turned to discharge lengthwise of and slightly downward upon the upper surface of the plate 26. The top of the main body of the fuel tip is as nearly flush as possible with the top of the plate 26, and is conveniently slightly inclined downwardly toward such plate. The passage 27 is a prolongation of the valve seat 29, with which coöperates a valve 30 having a valve stem 31 projecting rearward through a fuel tube 32 mounted in and extending through the wall of the elbow 22. At its forward end the tube 32 carries the fuel tip 25. The tube 32 and the valve stem 31 are conveniently in the axial line of the chambers 15 and 16. The tube 32 is provided at its rear end with a fitting 33, supplied with fuel from any suitable source through a pipe 34. The valve stem 31 projects through this fitting 33 and is provided at its rear end with a suitable adjusting handle or wheel 35. The fitting 33 may also be provided with a waste cock 36.

In operation, the fuel is supplied through the pipe 34, the fitting 33, the tube 32, and the passage 27 to the upper surface of the plate 26, the amount of fuel thus supplied being controlled by the adjustment of the valve 30 by its operating wheel 35. This fuel spreads out in a thin film over the upper surface of the plate 26, offering a large surface of exposure to the air which passes from the conduit 21 and by elbow 22 through the chamber 15, the mixture of oil and air thus produced passing on through the passage 19 and being discharged therefrom into the furnace, at which point it is burned. The heat of the flame is increased by the admission of preheated air from the conduit 23 through the annular chamber 16 and the annular passage 20, so that such preheated air forms an envelop around the mixture of air and fuel discharged into the furnace from the passage 19; this makes the combustion within the furnace most effective. The amount of the preheated air may be adjusted, and the temperature of the flames controled, by adjusting the valve 24, the valve 30 providing means for adjusting the amount of fuel consumed.

I claim as my invention:—

1. In an oil burner, an air passageway discharging at one end, and a fuel tip located in said passageway, said fuel tip comprising a plate having an upper surface which is flat all the way to its discharge end and a conduit leading to said plate and discharging obliquely upon the flat upper surface of said plate.

2. In an oil burner, an air passageway discharging at one end, and a fuel tip located in said passageway, said fuel tip comprising a plate and a conduit leading to said plate and discharging downwardly upon said plate, said conduit extending from the rear toward said plate below the level of the upper surface thereof and at its forward end being first turned upward to a point slightly above said level and then turned downward to discharge obliquely forwardly upon said plate.

3. A fuel tip, comprising a main body having a fuel passageway through it, and a plate having a flat upper surface upon which said fuel passageway discharges, said passageway extending through the main body upwardly and forwardly and having its forward end turned downward to discharge on to said surface downwardly and forwardly.

4. A fuel tip, comprising a main body having a fuel passageway through it, and a plate upon which said fuel passageway discharges, said passageway extending through the main body upwardly and forwardly and having its forward end turned downward to discharge on to said plate downwardly and forwardly.

5. A fuel tip, comprising a main body which at its forward end consists of a plate having a flat upper surface, said main body being provided with a fuel passageway which enters said main body from the rear and extends forwardly and in part upwardly to a point above and slightly behind the rear end of the upper surface of said plate and then discharges on to such upper surface, the cross section of said passage at its discharge end being long and narrow.

6. A fuel tip, comprising a main body which at its forward end consists of a plate, said main body being provided with a fuel passageway which enters said main body from the rear and extends forwardly and in part upwardly to a point above and slightly behind the rear end of the upper surface of said plate and then discharges on to such upper surface, the cross section of said fuel passage at its discharge end being long and narrow.

7. A fuel tip, comprising a main body which at its forward end consists of a plate having a flat upper surface, said main body being provided with a fuel passageway which enters said main body from the rear and extends forwardly and in part upwardly to a point above and slightly behind the rear end of the upper surface of said plate and then discharges on to such upper surface, the cross section of said passage at its discharge end being long and narrow, said fuel passageway at an intermediate point being formed into a valve seat, in combination with a valve coöperating with a valve seat.

8. A fuel tip, comprising a main body which at its forward end consists of a plate, said main body being provided with a fuel passageway which enters said main body from the rear and extends forwardly and in part upwardly to a point above and slightly behind the rear end of the upper surface of said plate and then discharges on to such upper surface, the cross section of said fuel passage at its discharge end being long and narrow, said fuel passageway at an intermediate point being formed into a valve seat, in combination with a valve coöperating with a valve seat.

In witness whereof, I have hereunto set my hand at Anderson, Indiana, this 22nd day of December, A. D. one thousand nine hundred and thirteen.

ALBERT D. SMITH.

Witnesses:
ADOLPH I. SMITH,
PAUL P. HAYNES.